(12) United States Patent
Kubo et al.

(10) Patent No.: US 6,301,982 B1
(45) Date of Patent: Oct. 16, 2001

(54) VARIABLE MECHANISM FOR MOUNTING ANGLE HOUSED GYRO-SENSOR AND METHOD OF MOUNTING VARIABLE MECHANISM FOR MOUNTING ANGLE

(75) Inventors: Hirotoshi Kubo; Kazunari Yamakado; Yasushi Takahashi, all of Hyogo; Hiroaki Sugino, Tokyo, all of (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/380,508
(22) PCT Filed: Jul. 10, 1997
(86) PCT No.: PCT/JP97/02400
  § 371 Date: Sep. 3, 1999
  § 102(e) Date: Sep. 3, 1999
(87) PCT Pub. No.: WO99/02943
  PCT Pub. Date: Jan. 21, 1999

(51) Int. Cl.[7] .................................................. G01C 19/02
(52) U.S. Cl. ................ 74/5.22; 74/5.41; 74/5.5; 74/5.9; 74/5.44
(58) Field of Search .................... 74/5.22, 5.41, 74/5.5, 5.9, 5.44, 527, 531

(56) References Cited

U.S. PATENT DOCUMENTS 1,282,811 * 10/1918 Goldburg ..................... 126/285 R
2,330,955 * 10/1943 Crane ............................ 74/527 X
2,407,696 * 9/1946 Webster ........................... 74/527
3,453,899 * 7/1969 Tarutani et al. .................. 474/82
5,816,097 * 10/1998 Park .................................. 74/5 R
5,974,675 * 11/1999 Yamada et al. ................... 33/318
5,988,654 * 11/1999 Wix et al. ...................... 280/6.15

FOREIGN PATENT DOCUMENTS 8-297033   11/1996   (JP) .
9-42979    2/1997    (JP) .
9-42990    2/1997    (JP) .

* cited by examiner

Primary Examiner—Allan D. Herrmann
(74) Attorney, Agent, or Firm—Sughrue, Mion, Zinn, Macpeak & Seas, PLLC

(57) ABSTRACT

A housed gyro-sensor 31 is housed in a rotation plate 33. The gyro-sensor 31 is mounted so that a rotation operation is enabled in a pitch axis direction about an axis in a mounting hole 24 formed on a housing of an inner face of the car navigation system 21. In this way, as shown in FIG. 8, even when the main body of the car navigation system 21 is not housed horizontally with respect to the vehicle, it is possible to regulate the mounting angle of the housed gyro sensor 31 in a horizontal direction by rotating the rotation plate 33. In order to realize how many times the rotation plate 33 needs to be rotated, standards for angle settings may be provided by directly printing the name of the vehicle type on an outer face of the rotation plate 33 or by printing the major angles.

14 Claims, 9 Drawing Sheets

VARIABLE MECHANISM FOR MOUNTING ANGLE HOUSED GYRO-SENSOR AND METHOD OF MOUNTING VARIABLE MECHANISM FOR MOUNTING ANGLE

FIELD OF THE INVENTION

The present invention relates to a method of mounting a variable mechanism for a mounting angle and to a housed gyro-sensor unit which can make a mounting angle of a housed gyro-sensor unit horizontal without reference to a mounting angle of a navigation system in a vehicle.

BACKGROUND TO THE INVENTION

Conventional methods of mounting a variable mechanism for the mounting angle of a housed gyro-sensor involve a method of fixing in a navigation system.

This type of conventional housed gyro-sensor mounted in a car navigation system is shown in FIG. 1 and FIG. 2. FIG. 1 is a schematic view of a car navigation system which has a housed gyro-sensor. FIG. 2 is a view of the state of a housed gyro-sensor when the car navigation system is mounted in an inclined position.

In FIG. 1, reference numeral 1 denotes car navigation system housed in a dashboard, 2 is a housed gyro-sensor fixed to the car navigation system. The housed gyro-sensor 2 is preferably maintained in a horizontal position with respect to the body of the vehicle. In particular, this has been necessary with respect to a gyro-sensor detecting the variable amount or absolute value of the angle of the horizontal periphery (rate).

The operation of the invention will be described below.

Since the housed gyro-sensor unit device 2 is fixed to the car navigation system 1, it has been necessary to choose a position at which it is possible to place at car navigation system 1 horizontally when mounting the car navigation system 1 in the vehicle body in order to hold the housed gyro-sensor in a horizontal position with respect to the vehicle body.

Since a method of mounting a conventional variable mechanism for a mounting angle of a housed gyro-sensor is arranged as outlined above, when the car navigation system 1 is not housed horizontally with respect to the vehicle body, that is to say, when the housed gyro-sensor is not housed horizontally with respect to the vehicle body, the problem of reduced accuracy in the housed gyro-sensor 2 has arisen since the housed gyro-sensor 2 must be used in a sloping position.

The present invention proposed to solve the above problems and has the object of providing of a variable mechanism for a mounting angle of a housed gyro-sensor and a method of mounting said mechanism. When a housed gyro-sensor 2 is mounted in a car navigation system body, the variable mechanism of the present invention can regulate the mounting angle of the housed gyro-sensor 2 without reference to a mounting angle of a car navigation system when mounted in a vehicle body and thus can be used in an ideal state.

The present invention has the further object of providing a method of mounting a variable mechanism for the mounting angle of a housed gyro-sensor in which horizontal adjustments are simplified.

The present invention has the further object of providing a variable mechanism for the mounting angle of a housed gyro-sensor and a method of mounting said mechanism in which it is not necessary to regulate the horizontal position manually.

The present invention has the further object of providing a variable mechanism for the mounting angle of a housed gyro-sensor and a method of mounting said mechanism in which an acceleration or deceleration G generated when the vehicle is running can be prevented from affecting the variable mechanism of the housed gyro-sensor.

DISCLOSURE OF THE INVENTION

The variable mechanism of the housed gyro-sensor according to a first aspect of the present invention is housed in a car navigation system and supports a housed gyro-sensor horizontally with respect to the vehicle body. The housed gyro-sensor detects an amount of variation or an absolute value of an angle of the horizontal periphery in the vehicle body.

In this way, it is possible to use the housed gyro-sensor in an ideal state without any reductions in accuracy.

The variable mechanism of the housed gyro-sensor according to a second aspect of the present invention is supported to move with respect to the housing of a car navigation system main body and fixes a housed gyro-sensor at an arbitrary position or a fixed position depending on the mounting angle of the car navigation main body.

In this way, it is possible to obtain the same effect as that of the first aspect of the invention.

The variable mechanism of the housed gyro-sensor according to a third aspect of the present invention forms a mounting hole in the housing of the car navigation system and supports a rotation plate, which houses the housed gyro-sensor, to rotate freely with respect to a pitch axis of the mounting hole.

In this way, it is possible to regulate the horizontal orientation of the housed gyro-sensor with a relatively simple moveable mechanism and it is possible to obtain the same effect as that of the first aspect of the invention.

The variable mechanism of the housed gyro-sensor according to a fourth aspect of the present invention forms a mounting hole in the housing of the car navigation system main body and a guiding groove along the circular periphery of the mounting hole. A hole for a connecting pin is formed at a position, corresponding to the guiding groove, on the rotation plate which houses the housed gyro-sensor. The variable mechanism is supported to rotate freely with respect to the direction of pitch of the mounting hole and is fixed by a connection pin which pierces both the connection pinhole and the guiding groove.

In this way, it is possible to obtain the same effect as that of the first aspect of the invention and it is possible to prevent errors in the position of the horizontal axis of the rotation plate due to vibrations from the vehicle body.

The variable mechanism of the housed gyro-sensor according a fifth aspect of the present invention forms a mounting hole in the housing of the car navigation system main body and a plurality of notches in the circular section. The rotation plate which houses the housed gyro-sensor is supported to rotate freely with respect to a pitch axis of the mounting hole and is slidably supported on the housing of the car navigation main body. A rotation plate stopper engages with a notch due to the pressing force of a spring member and prevents the rotation of the rotation plate.

In this way, it is possible to obtain the same effect as that of the first aspect of the invention and it is possible to house a gyro-sensor purchased by the user on the market easily in the vehicle if the angular interval of the notch is formed to fit the type of vehicle.

The variable mechanism of the housed gyro-sensor according to a sixth aspect of the present invention supports a rotation plate, which houses the housed gyro-sensor, free to rotate with respect to the pitch axial direction of the mounting hole formed in the housing of the car navigation system main body. The rotation plate stopper which is slidably supported in the housing of the car navigation system main body is adapted to abut with the circular section of the rotation plate by a spring member which presses in the direction of the rotation plate thus preventing the rotation of the rotation plate.

In this way it is possible to obtain the same effect as that of the first aspect of the invention and it is possible to perform minute adjustments.

The variable mechanism of the housed gyro-sensor according to a seventh aspect of the present invention is supported to move freely with respect to the housing of a car navigation main body and horizontally supports a housed gyro-sensor with respect to a vehicle body without reference to the angle of mounting of a car navigation system main body.

In this way. it is unnecessary to regulate manually and it is possible to maintain the same level of accuracy as when the housed gyro-sensor is mounted horizontally in the normal manner.

The variable mechanism of the housed gyro-sensor according to an eighth aspect of the present invention engages a spherical section which is provided on the end of an arm which extends from the housed gyro-sensor with a retaining indentation in the housing of the car navigation system main body.

In this way, it is possible to obtain the same effect as that of the seventh aspect of the invention.

The variable mechanism of the housed gyro-sensor according to a ninth aspect of the present invention supports a rotation plate disposing a balancer below the housed gyro-sensor to rotate freely with respect to a direction of a pitch axis of the mounting hole formed on the housing of the car navigation system main body.

In this way, it is possible to obtain the same effect as that of the seventh aspect of the invention, it is unnecessary to regulate manually and it is possible to maintain the same level of accuracy as when the housed gyro-sensor is mounted horizontally in the normal manner.

The variable mechanism of the housed gyro-sensor according to a tenth aspect of the present invention supports a damper having contacting ends which connect with the rotation plate in the housing of the car navigation system main body. Although a rapid rotation force of the rotation plate is absorbed, a slight rotation force of the rotation plate is not absorbed.

In this way, it is possible to obtain the same effect as that of the seventh aspect of the invention, and mounting angle of the variable mechanism of the mounting angle of a housed gyro-sensor can be prevented from rapid variation.

The variable mechanism of the housed gyro-sensor according to an eleventh aspect of the present invention is provided with an inclination detection mechanism on the housing of the car navigation system main body. The inclination detection mechanism detects an inclination of the housed gyro-sensor and corrects an output value from the housed gyro-sensor depending on the inclination of the car navigation system main body to a value when the housed gyro-sensor is disposed horizontally.

In this way, even when the main body of the car navigation system is housed in a non-horizontal state with respect to the vehicle body, it is possible to maintain the same level of accuracy as when the housed gyro-sensor is normally housed in a horizontal manner.

The method of mounting the housed gyro-sensor according to a twelfth aspect of the present invention entails the steps of housing the mechanism in the car navigation system and supporting the housed gyro-sensor which detects the amount of variation or the absolute value of the angle of the horizontal periphery in the vehicle body horizontally with respect to the vehicle body.

In this way, it is possible for the housed gyro-sensor to be used in an ideal state without any reduction in accuracy.

The method of mounting the housed gyro-sensor according to a thirteenth aspect of the present invention entails the steps of supporting the mechanism to move freely in the housing of the car navigation system and fixing the housed gyro-sensor at a fixed position or an arbitrary position depending on the angle of the mounting of the car navigation system main body.

In this way, it is possible to obtain the same effect as that of the twelfth aspect of the invention.

The method of mounting the housed gyro-sensor according to a fourteenth aspect of the present invention entails the steps of supporting the mechanism to move freely with respect to the housing of the car navigation system and supporting the housed gyro-sensor horizontally with respect to the vehicle without reference to the mounting angle of the car navigation system main body.

In such a way, it is possible to avoid making adjustments manually and it is possible to maintain the same level of accuracy as when the housed gyro-sensor is normally mounted horizontally.

PREFERRED EMBODIMENTS OF THE INVENTION

In order to describe the invention in greater detail, the preferred embodiments will be outlined below with reference to the accompanying figures.

Embodiment 1

Figure 3:
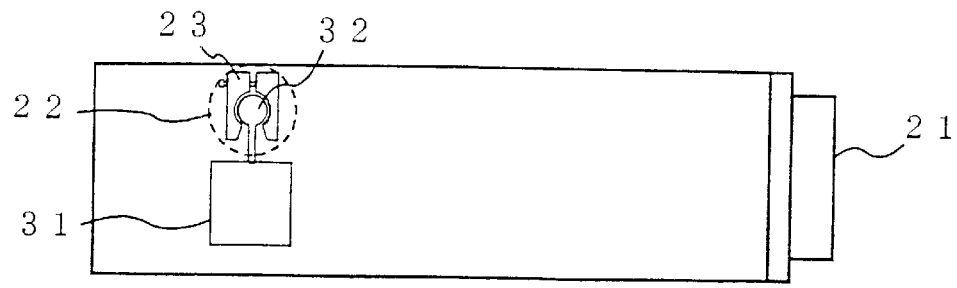
FIG. 3 is a lateral view of the car navigation system housing a variable mechanism for the mounting angle of the housed gyro-sensor according to the first embodiment of the present invention.
Figure 4:
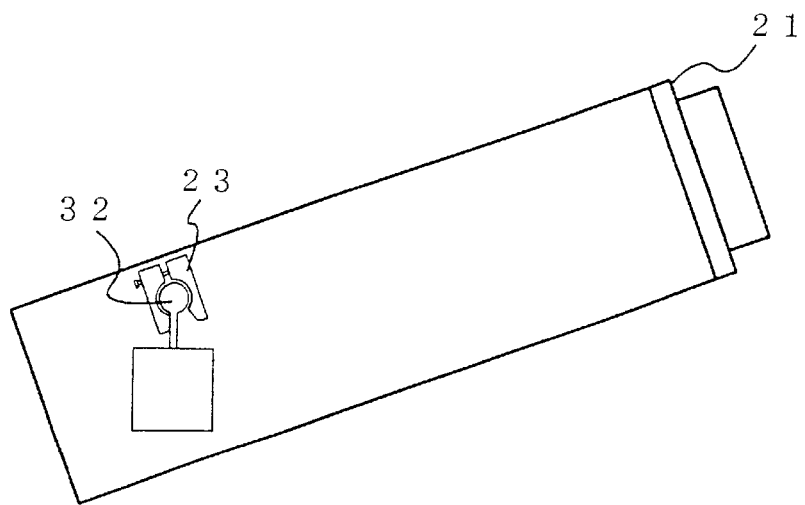
FIG. 4 is a lateral view of the housed gyro-sensor when the car navigation system which houses a variable mechanism for the angle of mounting a housed gyro-sensor is housed in an inclined state in a first embodiment of the present invention.
Figure 5:
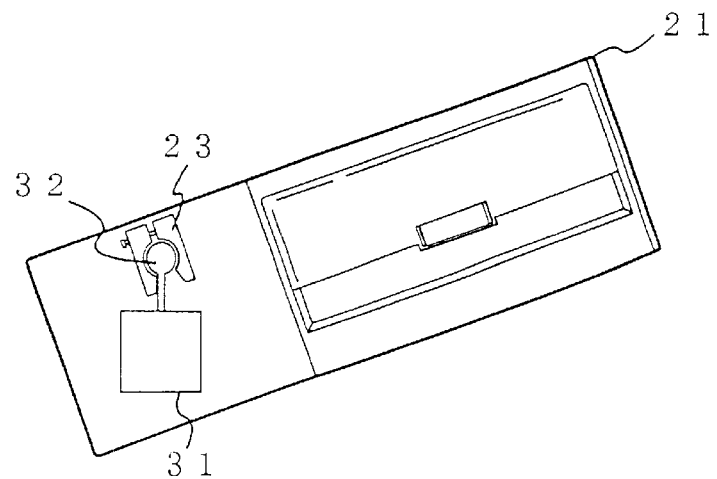
FIG. 5 is a front view of the housed gyro-sensor when the car navigation system which houses a variable mechanism for the angle of mounting a housed gyro-sensor is housed in an inclined state in a first embodiment of the present invention.

FIG. 3 is a lateral view of the car navigation system housing a variable mechanism for the mounting angle of the housed gyro-sensor according to the first embodiment of the present invention. FIG. 4 is a lateral view of the housed gyro-sensor when the car navigation system which houses a variable mechanism for the angle of mounting a housed gyro-sensor is housed in an inclined state in a first embodiment of the present invention. FIG. 5 is a front view of the housed gyro-sensor when the car navigation system which houses a variable mechanism for the angle of mounting a housed gyro-sensor is housed in an inclined state in a first embodiment of the present invention. In the figures, reference numeral 21 denotes a car navigation system, 22 is a displaceable mechanism (variable mechanism for mounting angle) comprised of a retaining indentation 23 which is fixed to the car navigation system 21 and a spherical section 32 of the housed gyro-sensor 31, 23 is a retaining indentation which holds the spherical section 32 of the housed gyro-sensor 31 so as to move freely. 31 is a housed gyro-sensor on the upper section of which a spherical section 32 is formed through the arm and which detects a rate bearing.

The operation of the invention will be described below.

Figure 1:
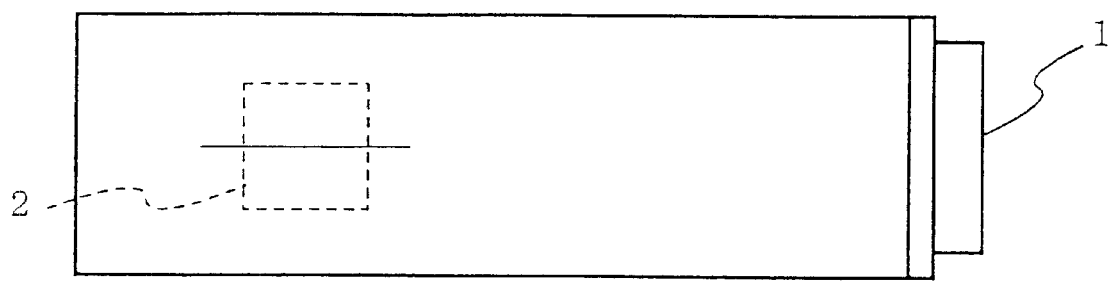
FIG. 1 is a schematic view of a car navigation system having a housed gyro-sensor.
Figure 2:
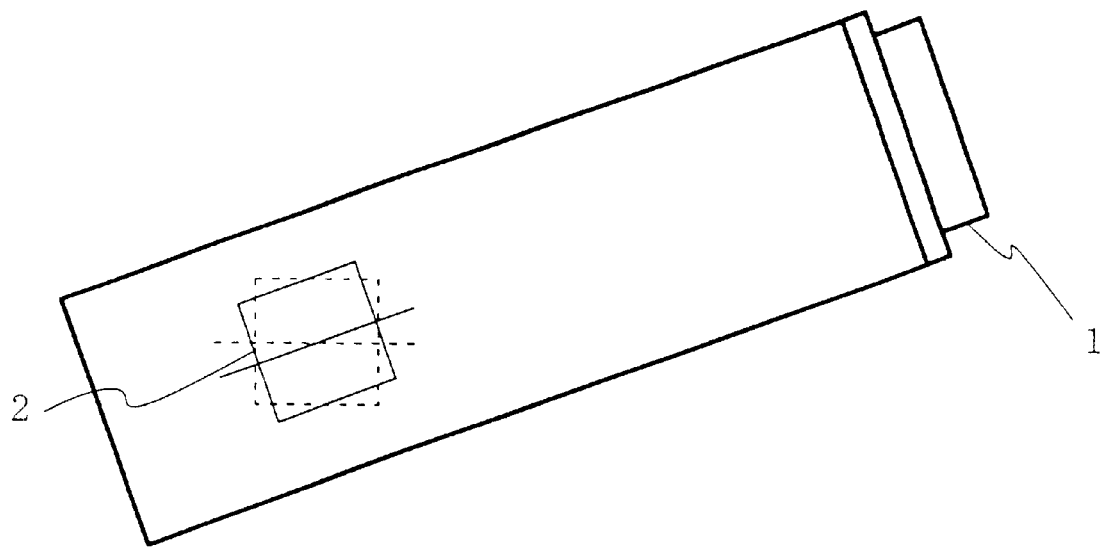
FIG. 2 is a view of the state of the housed gyro-sensor when the car navigation system as shown in FIG. 1 is housed in an inclined state.

In a conventional housed gyro-sensor 2 in a car navigation system 1 as shown in FIG. 1 and FIG. 2, when the car navigation system 1 is not mounted horizontally with respect to the vehicle body, the mounting angle of the housed gyro-sensor 2 is also not horizontal with respect to the vehicle body as the housed gyro-sensor 2 is fixed to the car navigation system 1.

However the housed gyro-sensor 31 of the first embodiment of the present invention is held to be freely movable by the retaining indentation 23 of the variable mechanism 22 through the spherical section 32. In this way, as shown in FIG. 4 and FIG. 5, even when the main body of the car navigation system 21 is not housed horizontally with respect to the vehicle body, it is possible to hold the housed gyro-sensor 31 horizontally with respect to the vehicle body.

As shown above, according to the first embodiment, the angle of holding the housed gyro-sensor 31 does not depend on the mounting angle of the car navigation system 21 and can be maintained horizontally with respect to the vehicle body. Thus it is possible to maintain a fixed accuracy of the stored gyro-sensor 31.

Embodiment 2

Figure 6:
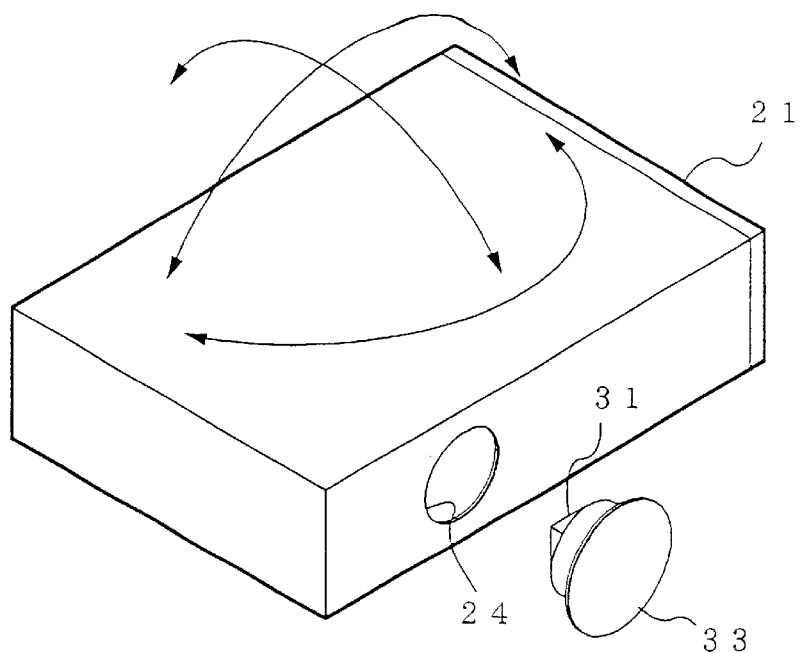
FIG. 6 is an perspective view showing a car navigation system which houses a variable mechanism for the angle of mounting a housed gyro-sensor in a second embodiment of the present invention.
Figure 7:
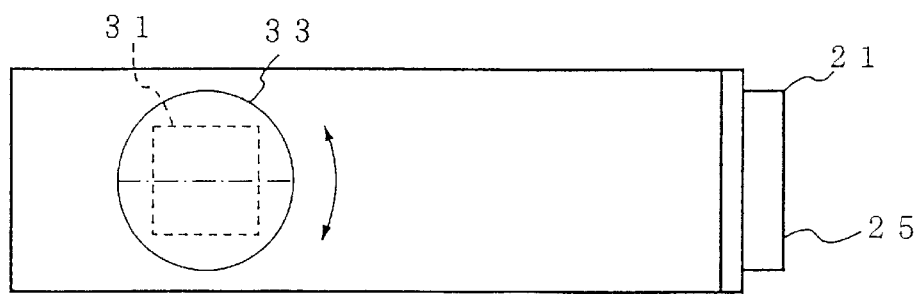
FIG. 7 is a lateral view of the car navigation system which houses a variable mechanism for the angle of mounting a housed gyro-sensor in a second embodiment of the present invention.
Figure 8:
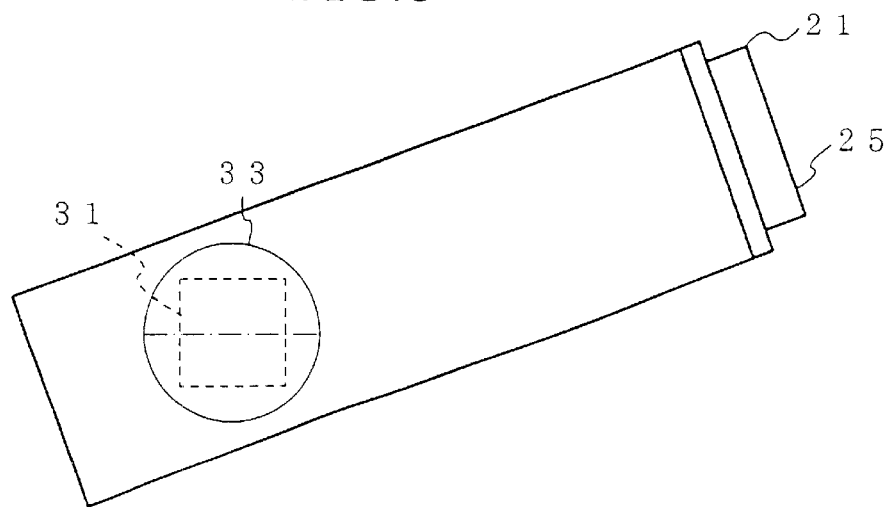
FIG. 8 is a lateral view of the housed gyro-sensor when the car navigation system which houses a variable mechanism for the angle of mounting a housed gyro-sensor is housed in an inclined state in a second embodiment of the present invention.

FIG. 6 is an perspective view showing a car navigation system which houses a variable mechanism for the angle of mounting a housed gyro-sensor in a second embodiment of the present invention. FIG. 7 is a lateral view of the car navigation system which houses a variable mechanism for the angle of mounting a housed gyro-sensor in a second embodiment of the present invention. FIG. 8 is a lateral view of the housed gyro-sensor when the car navigation system which houses a variable mechanism for the angle of mounting a housed gyro-sensor is housed in an inclined state in a second embodiment of the present invention. In the figures, those elements which are the same or similar to those in Embodiment 1 are designated by the same numerals and will not be explained further. Reference numeral 24 is a mounting hole (the variable mechanism for mounting angle) which is formed on the housing on the side face of the car navigation system 21. 33 is a rotation plate (the variable mechanism for mounting angle) which is held free to rotate with respect to the pitch axial direction of the mounting hole 24. The housed gyro-sensor 31 is housed on an inner side of the rotation plate 33.

The operation of the invention will be described below.

The housed gyro-sensor 31 is mounted so that it is housed inside the rotation plate 33 and can rotate in the direction of the pitch axis about an axis of the mounting hole 24 formed on the housing on the inner face of the car navigation system 21. In this way, as shown in FIG. 8, even when the main body of the car navigation system 21 is housed in a state which is not horizontal to the vehicle, it is possible to regulate horizontally the mounting angle of the housed gyro-sensor 31 with respect to the vehicle. At this time, in order to realize how many times the rotation plate 33 needs to be rotated, standards for angle settings may be provided by directly printing the name of the vehicle type on an outer face of the rotation plate 33 or by printing the major angles.

In particular, with reference to the vehicle mounted car navigation system 21, when the roll axis of the housing of the car navigation system 21 is inclined, mounting the housing of the car navigation system 21 on the vehicle by inclining the roll axis is impossible since the control panel 25 which is provided on the front face diverges to the right and laterally. Thus it is only possible to adapt the present invention to the regulation of inclination in the pitch axis of the housing of the car navigation system.

As shown above, according to the second embodiment, it is possible to regulate the horizontal orientation of the housed gyro-sensor 31 by a relatively simple movable mechanism.

Embodiment 3

Figure 9:
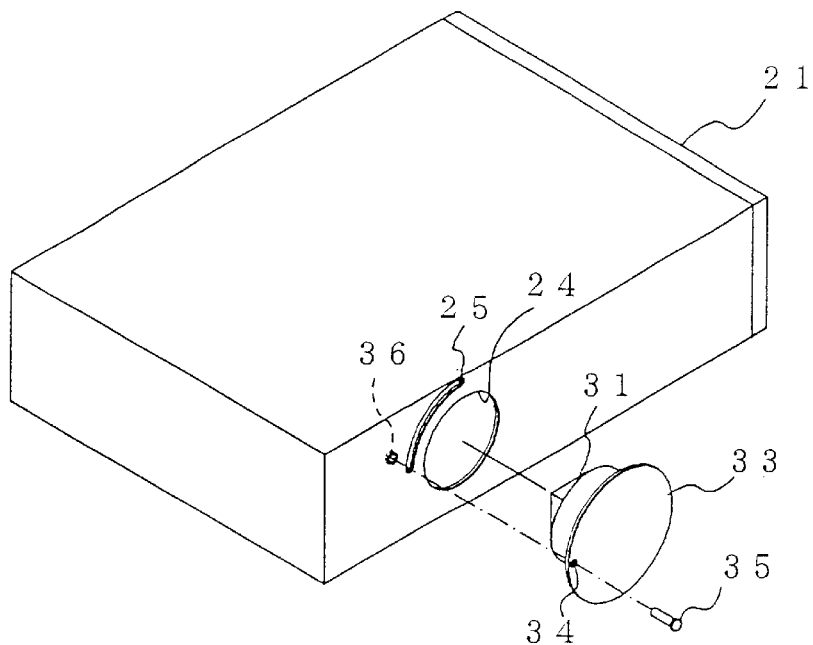
FIG. 9 is a perspective view showing a car navigation system which houses a variable mechanism for the angle of mounting a housed gyro-sensor in a third embodiment of the present invention.
Figure 10:
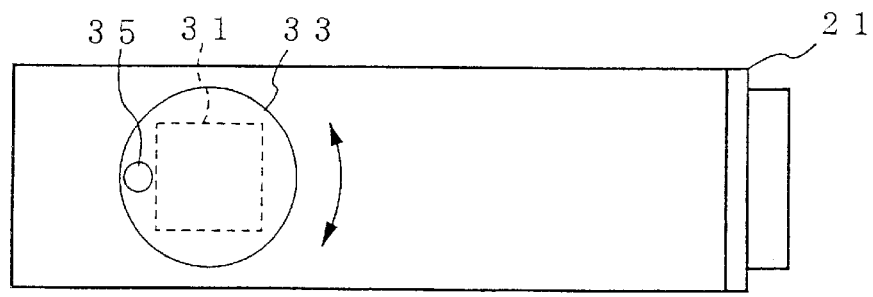
FIG. 10 is a lateral view showing a car navigation system which houses a variable mechanism for the angle of mounting a housed gyro-sensor in a third embodiment of the present invention.
Figure 11:
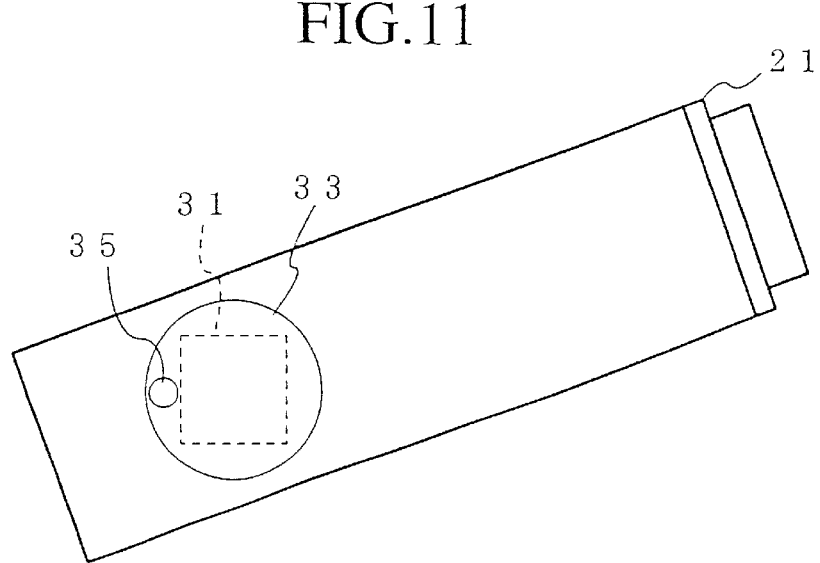
FIG. 11 is a lateral view of the housed gyro-sensor when the car navigation system which houses a variable mechanism for the angle of mounting a housed gyro-sensor is housed in an inclined state in a third embodiment of the present invention.

FIG. 9 is an inclined view showing a car navigation system which houses a variable mechanism for the angle of mounting a housed gyro-sensor in a third embodiment of the present invention. FIG. 10 is a lateral view showing a car navigation system which houses a variable mechanism for the angle of mounting a housed gyro-sensor in a third embodiment of the present invention. FIG. 11 is a lateral view of the housed gyro-sensor when the car navigation system which houses a variable mechanism for the angle of mounting a housed gyro-sensor is housed in an inclined state in a third embodiment of the present invention. In the figures, those elements which are the same or similar to those in Embodiment 1 and Embodiment 2 are designated by the same numerals and will not be explained further. 25 is a guiding groove (variable mechanism for mounting angle) which is formed along the periphery of the mounting hole 24. 34 is at connecting pinhole (variable mechanism for mounting angle) which is formed on the rotation plate 33. 35 is a connecting pin (variable mechanism for mounting angle) which passes through the guiding groove 25 and the connecting pinhole 34 and which guides the rotation plate 33 through a fixed angle along the guiding groove 25, 36 is a nut which retains the connecting pin 35 on the car navigation system 21.

The operation of the invention will be described below.

The housed gyro-sensor 31 is housed on an inner side the rotation plate 33 and is inserted into the mounting hole 24 formed on the housing on the inner face of the car navigation system 21. As shown in FIG. 11 when the main body of the car navigation system 21 is housed in a position which is not horizontal with respect to the vehicle, the rotation plate 33 is rotated depending on the angle of inclination of the car navigation system and held so that the horizontal axis of the housed gyro-sensor 31 is horizontal to the vehicle. Thereafter the connecting pin 35 is inserted into the connecting pinhole 34 of the rotation plate 33 and is fixed to the housing on the inner face of the car navigation system 21 by a nut 36.

As shown above according to Embodiment 3, it is possible to perform the horizontal regulation of the housed gyro-sensor 31 with a relatively simple mechanism and it is possible to prevent errors in the position of the horizontal axis of the rotation plate 33 due to vibrations from the vehicle body.

Embodiment 4

Figure 12:
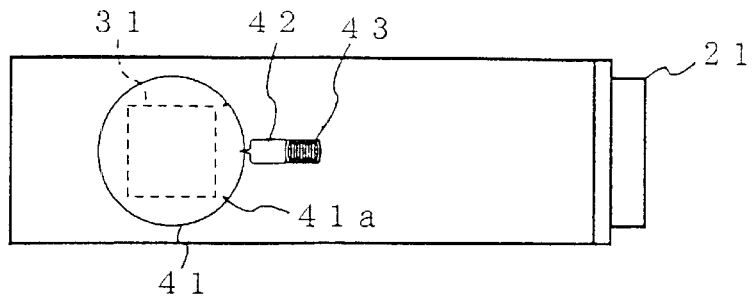
FIG. 12 is a view showing a car navigation system which houses a variable mechanism for the angle of mounting a housed gyro-sensor in a fourth embodiment of the present invention.
Figure 13:
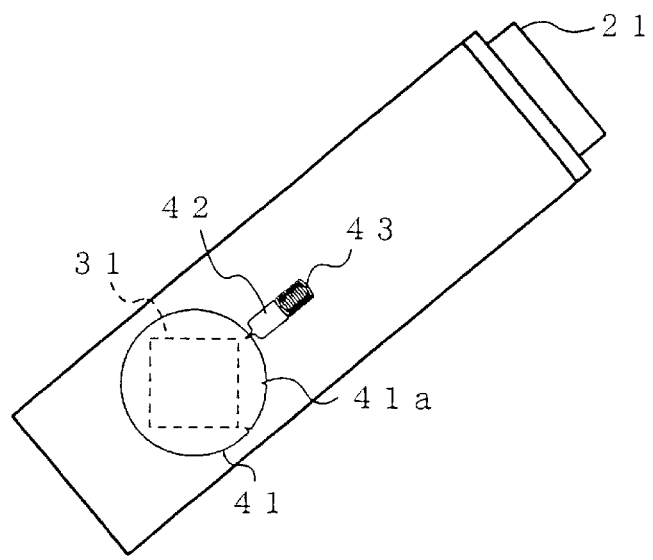
FIG. 13 is a lateral view of the housed gyro-sensor when the car navigation system which houses a variable mechanism for the angle of mounting a housed gyro-sensor is housed in an inclined state with the right side raised in a fourth embodiment of the present invention.
Figure 14:
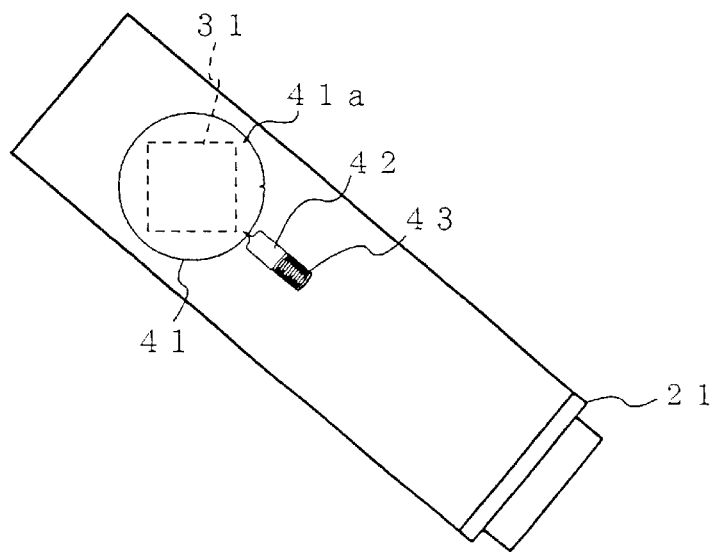
FIG. 14 is a lateral view of the housed gyro-sensor when the car navigation system which houses a variable mechanism for the angle of mounting a housed gyro-sensor is housed in an inclined state with the right side depressed in a fourth embodiment of the present invention.

FIG. 12 is a view showing a car navigation system which houses a variable mechanism for the angle of mounting a housed gyro-sensor in a fourth embodiment of the present invention. FIG. 13 is a lateral view of the housed gyro-sensor when the car navigation system which houses a variable mechanism for the angle of mounting a housed gyro-sensor is housed in an inclined state with the right side raised in a fourth embodiment of the present invention. FIG. 14 is a lateral view of the housed gyro-sensor when the car navigation system which houses a variable mechanism for the angle of mounting a housed gyro-sensor is housed in an inclined state with the right side depressed in a fourth embodiment of the present invention. In the figures, those elements which are the same or similar to those in Embodiment 1 to Embodiment 3 are designated by the same numerals and will not be explained further. 41 is a rotation plate (variable mechanism for mounting angle) which forms a plurality of notches 41a. 42 is a rotation plate stopper (variable mechanism for mounting angle) which is mounted on the housing on an inner face of the car navigation system 21, the end of which is inserted into the notch 41a of the rotation plate 41 and which holds the rotation plate 41 at a fixed angle. 43 is a spring member (variable mechanism for mounting angle) which presses the rotation plate stopper 42 on the side of the rotation plate 41.

The operation of the invention will be described below.

A housed gyro-sensor is housed inside a rotation plate 41 and is inserted into the mounting hole 24 formed on the housing of the inner face of the car navigation system 21. As shown in FIG. 13 and FIG. 14, when the main body of the car navigation system 21 is not housed horizontally with respect to the vehicle body, the rotation plate 41 is rotated depending on an angle of inclination of the car navigation system and the horizontal axis of the housed gyro-sensor 31 is maintained in a horizontal position. Thereafter the end of the rotation plate stopper 42 is inserted into the notch 41a of the rotation plate 41 and the rotation plate 41 is maintained at a fixed angle. At this time, the rotation plate 41 is fixed to the housing of the inner face of the car navigation system 21.

As shown above in embodiment 4, it is possible to regulate the horizontal disposition of the housed gyro-sensor 31 with a relatively simple mechanism. If the angle interval of the notch 41a of the rotation plate 41 is formed appropriately with the type of vehicle, it is possible to easily store a gyro-sensor purchased by the user on the market in the vehicle.

Embodiment 5

Figure 15:
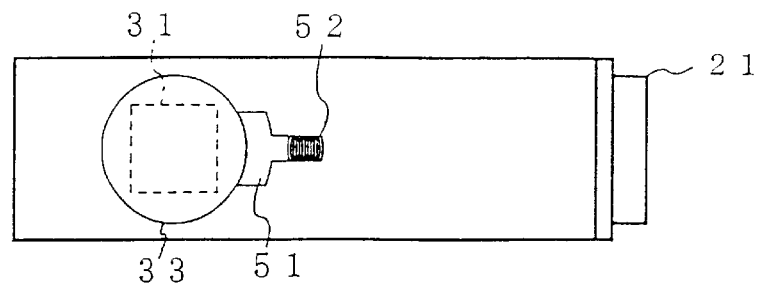
FIG. 15 is a view showing a car navigation system which houses a variable mechanism for the angle of mounting a housed gyro-sensor in a fifth embodiment of the present invention.
Figure 16:
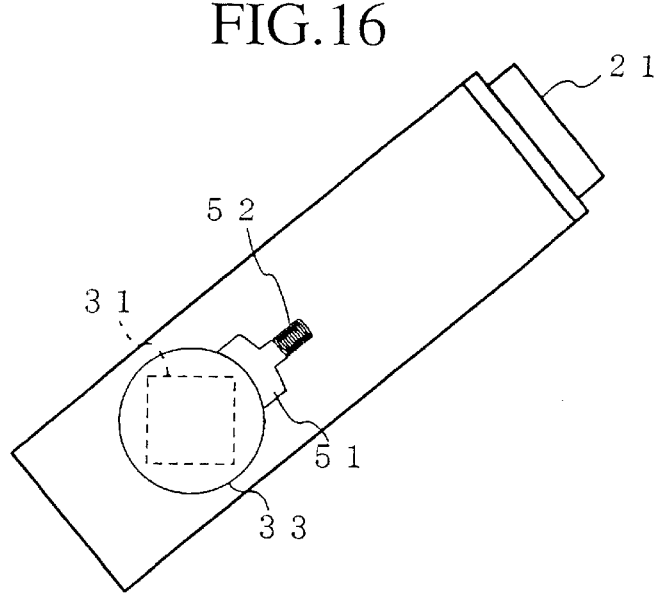
FIG. 16 is a lateral view of the housed gyro-sensor when the car navigation system which houses a variable mechanism for the angle of mounting a housed gyro-sensor is housed in an inclined state with the right side raised in a fifth embodiment of the present invention.
Figure 17:
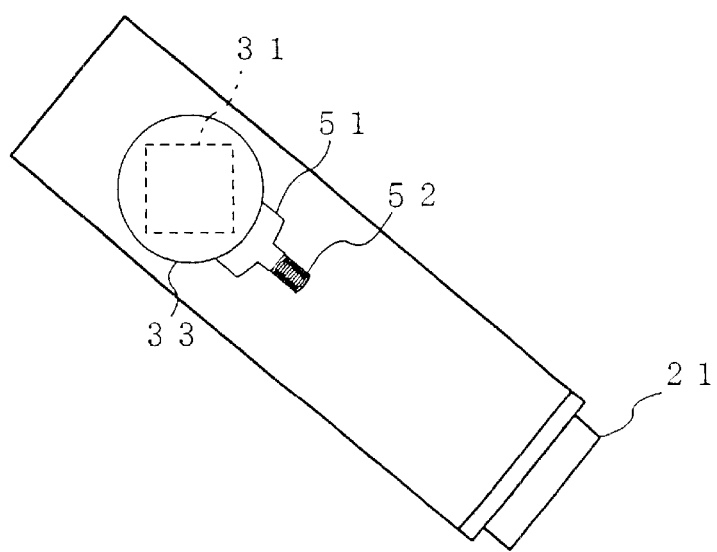
FIG. 17 is a lateral view of the housed gyro-sensor when the car navigation system which houses a variable mechanism for the angle of mounting a housed gyro-sensor is housed in an inclined state with the right side depressed in a fifth embodiment of the present invention.

FIG. 15 is a view showing a car navigation system which houses a variable mechanism for the angle of mounting a housed gyro-sensor in a fifth embodiment of the present invention. FIG. 16 is a lateral view of the housed gyro-sensor when the car navigation system which houses a variable mechanism for the angle of mounting a housed gyro-sensor is housed in an inclined state with the right side raised in a fifth embodiment of the present invention. FIG. 17 is a lateral view of the housed gyro-sensor when the car navigation system which houses a variable mechanism for the angle of mounting a housed gyro-sensor is housed in an inclined state with the right side depressed in a fifth embodiment of the present invention. In the figures, those elements which are the same or similar to those in Embodiment 1 to Embodiment 4 are designated by the same numerals and will not be explained further. 51 is a resisting section (variable mechanism for mounting angle) which is normally in abutment with the circular section of the rotation plate 33 and which stops the rotation plate at a fixed position by the pressure from the spring member 52 (variable mechanism for mounting angle). The rotation plate 33 can be fixed to an arbitrary position by the force of friction between the circular section of the rotation plate 33 and the resisting section 51.

The operation of the invention will be described below.

A housed gyro-sensor 31 is housed inside a rotation plate 33 and is inserted into the mounting hole 24 formed on the housing of the inner face of the car navigation system 21. As shown in FIG. 16 and FIG. 17, when the main body of the car navigation system 21 is not housed horizontally with respect to the vehicle body, the rotation plate 41 is rotated depending on an angle of inclination of the car navigation system and the horizontal axis of the housed gyro-sensor 31 is maintained in a horizontal position. Thereafter the rotation force is increased to overcome the frictional force between the circular section of the rotation plate 33 and the resisting section 51. Thus the rotation plate 33 can be maintained in an arbitrary position.

As shown above, according to embodiment 5, it is possible to horizontally adjust the housed gyro-sensor 31 by a relatively simple movable mechanism by eliminating the necessity of fixing and releasing the rotation plate 33 by the nut 36 and the connection hole at which were used in embodiment 3. At the same time, minute adjustments can be performed.

Embodiment 6

Figure 18:
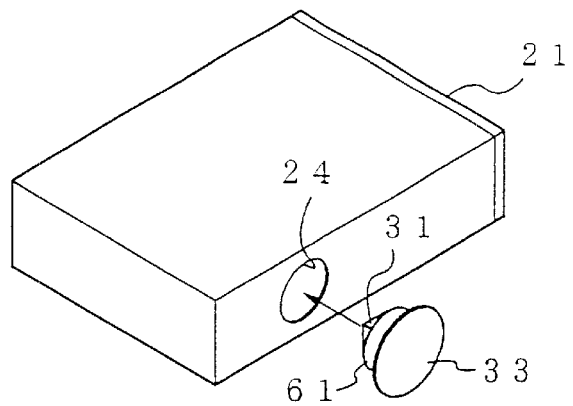
FIG. 18 is a perspective view showing a car navigation system which houses a variable mechanism for the angle of mounting a housed gyro-sensor in a sixth embodiment of the present invention.
Figure 19:
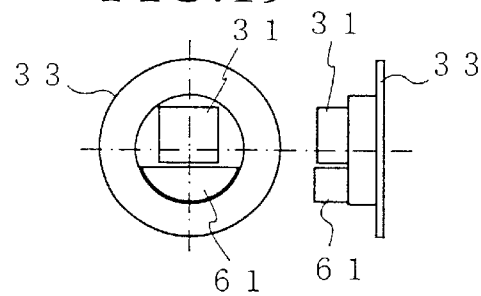
FIG. 19 is a lateral and rear view of a variable mechanism for the angle of mounting a housed gyro-sensor in a sixth embodiment of the present invention.
Figure 20:
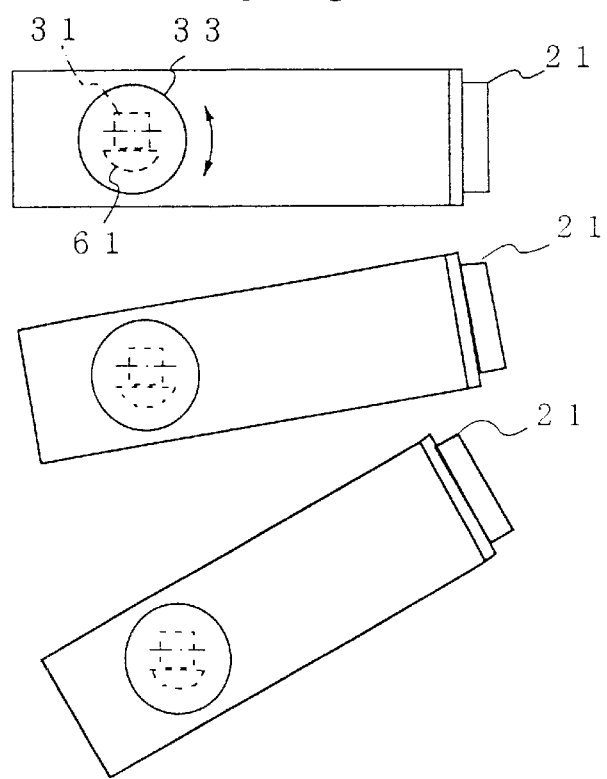
FIG. 20 is a lateral view of the housed gyro-sensor when the car navigation system which houses a variable mechanism for the angle of mounting a housed gyro-sensor is housed in an inclined state with the right side depressed in a sixth embodiment of the present invention.

FIG. 18 is a perspective view showing a car navigation system which houses a variable mechanism for the angle of mounting a housed gyro-sensor in a sixth embodiment of the present invention. FIG. 19 is a lateral and rear view of a variable mechanism for the angle of mounting a housed gyro-sensor in a sixth embodiment of the present invention. FIG. 20 is a lateral view of the housed gyro-sensor when the car navigation system which houses a variable mechanism for the angle of mounting a housed gyro-sensor is housed in an inclined state with the right side depressed in a sixth embodiment of the present invention. In the figures, those elements which are the same or similar to those in Embodiment 1 to Embodiment 5 are designated by the same numerals and will not be explained further. 61 is a balancer (variable mechanism for mounting angle) which is housed on an end of the rear face of the rotation plate 33 which is held free to rotate in the mounting hole 24. The rotation plate 33 is rotated by the weight of the balancer 61 and the housed gyro-sensor 31 is maintained in a normally horizontal orientation with respect to the vehicle body.

The operation of the invention will be described below.

A housed gyro-sensor 31 is housed inside a rotation plate 41 and is inserted into the mounting hole 24 formed on the housing of the inner face of the car navigation system 21. As shown in FIG. 20, when the main body of the car navigation system 21 is not housed horizontally with respect to the vehicle body, the rotation plate 33 is rotated depending on an angle of inclination of the car navigation system and the horizontal axis of the housed gyro-sensor 31 is automatically maintained in a horizontal position by the balancer 61 provided on the lower face of the housed gyro-sensor 31.

As shown above, according to embodiment 6, it is not necessary to adjust the variable mechanism for the mounting angle of the housed gyro-sensor 31 manually. Furthermore the housed gyro-sensor can maintain the same level of accuracy as when normally mounted horizontally.

Embodiment 7

Figure 21:
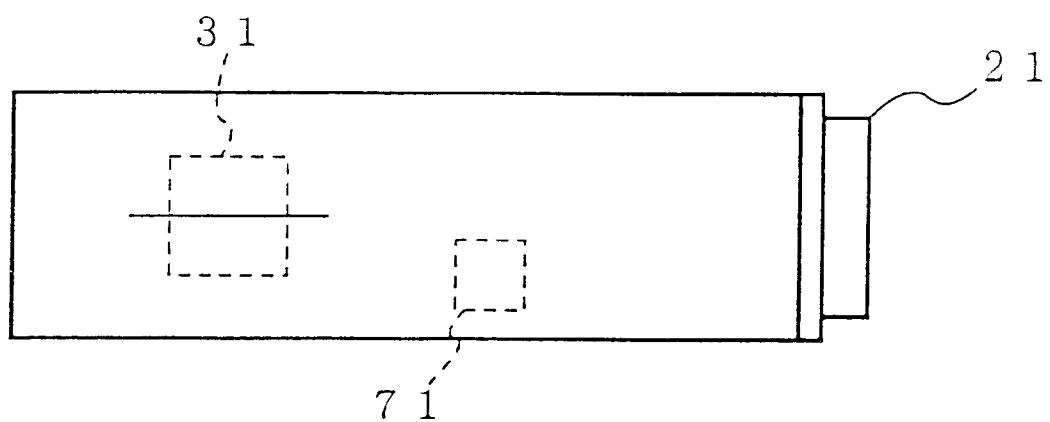
FIG. 21 is a view showing a car navigation system which houses a variable mechanism for the angle of mounting a housed gyro-sensor in a seventh embodiment of the present invention.
Figure 22:
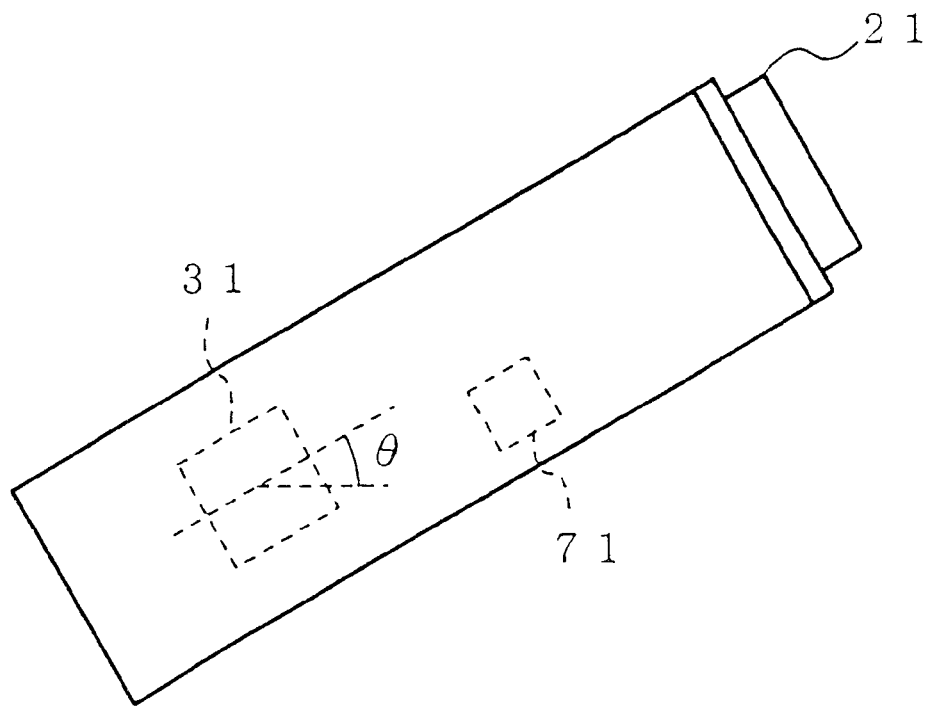
FIG. 22 is a lateral view of the housed gyro-sensor when the car navigation system which houses a variable mechanism for the angle of mounting a housed gyro-sensor is housed in an inclined state with the right side raised in a seventh embodiment of the present invention.

FIG. 21 is a view showing a car navigation system which houses a variable mechanism for the angle of mounting a housed gyro-sensor in a seventh embodiment of the present invention. FIG. 22 is a lateral view of the housed gyro-sensor when the car navigation system which houses a variable mechanism for the angle of mounting a housed gyro-sensor is housed in an inclined state with the right side raised in a seventh embodiment of the present invention. In the figures, those elements which are the same or similar to those in Embodiment 1 to Embodiment 6 are designated by the same numerals and will not be explained further. 71 is an inclination detection mechanism which detects an inclination θ of the housed gyro-sensor 31 which is housed in the housing of the car navigation system 21 and which corrects the output value from the housed gyro-sensor 31 depending on the inclination θ of the car navigation system 21.

The operation of the invention will be described below.

As shown in FIG. 22, when the car navigation system 21 is not housed horizontally with respect to the vehicle body, the inclination detection mechanism 71 which is housed in proximity to the housed gyro-sensor 31 detects an inclination θ of the of the main body of the car navigation system 21. The output value from the housed gyro-sensor 31 depending on the inclination θ of the car navigation system 21 is corrected to the value when the housed gyro-sensor 31 is disposed horizontally.

As shown above, according to embodiment 7, even when the main body of the car navigation system 21 is not housed horizontally with respect to the vehicle body it is possible to correct to the value when the housed gyro-sensor 31 is disposed horizontally. Thus the housed gyro-sensor 31 can maintain the same level of accuracy as when normally mounted horizontally.

Embodiment 8

Figure 23:
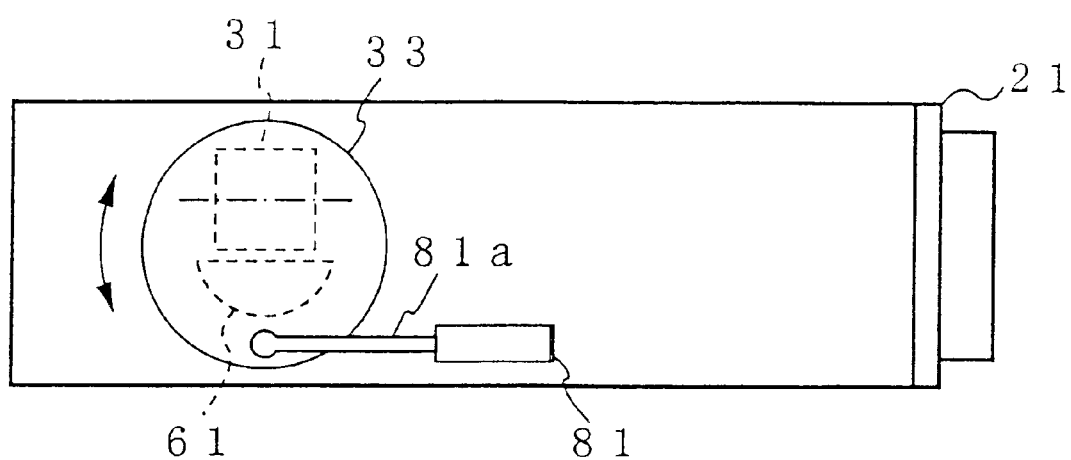
FIG. 23 is a view showing a car navigation system which houses a variable mechanism for the angle of mounting a housed gyro-sensor in an eighth embodiment of the present invention.

FIG. 23 is a view showing a car navigation system which houses a variable mechanism for the angle of mounting a housed gyro-sensor in an eighth embodiment of the present invention. In the figures, those elements which are the same or similar to those in Embodiment 1 to Embodiment 8 are designated by the same numerals and will not be explained further. 81 is a damper which has the following characteristics. The contact end 81a contacts the rotation plate 33. A rapid rotation force of the rotation plate is absorbed and a slight rotation force of the rotation plate is not absorbed.

The operation of the invention will be described below.

When the car navigation system 21 is mounted on an incline in the vehicle body, the rotation plate 33 is rotated at a relatively low speed by the weight of the balancer 61. Thus in this case, the rotation force is not absorbed by the damper 81. Thus the rotation plate 33 rotates and the housed gyro-sensor 31 can be regulated automatically to a horizontal position. On the other hand when the vehicle is running, gravity G which is generated by the acceleration or braking of the vehicle acts on the balancer 61 and tries to rotate the rotation plate 33. However the rotation force of the rotation plate 33 at this time is at a relatively high speed. Thus the rotation force is absorbed by the damper 81. Therefore the rotation plate undergoes almost no rotation and the housed gyro-sensor is maintained in a horizontal position.

As shown above, according to embodiment 8, it is unnecessary to regulate the variable mechanism of the mounting angle of the housed gyro-sensor 31 manually. Thus the housed gyro-sensor can maintain the same level of accuracy as when normally mounted horizontally. Furthermore it is possible to prevent the mounting angle of the variable mechanism for the mounting angle of the housed gyro-sensor 31 from rapid variation.

Industrial Application

As shown above, the variable mechanism for the mounting angle of a housed gyro-sensor according to the present invention and a method therefor is adapted from use with a mounting mechanism of a housed gyro-senor in a car navigation system.

What is claimed is:

1. A vehicle navigation system comprising:
   a housing provided with a mounting hole;
   a vehicle navigation system main body provided in said housing; and
   a rotation plate supporting a housed gyro-sensor, said rotation plate mounted on said mounting hole, such that said housed gyro-sensor is located in said housing;
   wherein said rotation plate and said housed gyro-sensor are insertable as a unit into said housing, after first passing through said mounting hole from an exterior of said housing.

2. A vehicle navigation system according to claim 1, wherein said housed gyro-sensor is (1) rotatably supported relative to said housing and (2) secured in position depending on a mounting angle of said vehicle navigation system main body.

3. A vehicle navigation system according to claim 2, wherein said rotation plate is freely rotatable with respect to a pitch axis direction of said mounting hole.

4. A vehicle navigation system according to claim 2, further comprising:
   a guide groove provided in said housing along a circular periphery of said mounting hole;
   a connection pinhole provided in said rotation plate at a position corresponding to said guide groove, said rotation plate being rotatable with respect to a pitch axis direction of said mounting hole; and
   a connection pin inserted through said connection pinhole and said guide groove, said connection pin being slidable in said guide groove.

5. A vehicle navigation system according to claim 2, further comprising:
   a plurality of notches provided on a circular section of said rotation plate, said rotation plate being rotatable with respect to a pitch axis direction of said mounting hole;
   a rotation plate stopper provided on said housing, said rotation plate stopper engaging with a notch formed on said rotation plate and stopping rotation of said rotation plate; and
   a spring member influencing said rotation plate stopper toward said rotation plate.

6. A vehicle navigation system according to claim 2, wherein said rotation plate is rotatable with respect to a pitch axis direction of said mounting hole, and said vehicle navigation system further comprises:
   a rotation plate stopper provided on said housing, said rotation plate stopper abutting with a circular section of said rotation plate and stopping rotation of said rotation plate; and
   a spring member influencing said rotation plate stopper toward said rotation plate.

7. A vehicle navigation system according to claim 1, wherein said housed gyro-sensor is (1) rotatably supported relative to said housing without reference to a mounting angle of said vehicle navigation system main body, and (2) supported horizontally with respect to a vehicle.

8. A vehicle navigation system comprising:
   a housing;
   a vehicle navigation system main body provided in said housing;
   a housed gyro-sensor movably supported in said housing without reference to a mounting angle of said vehicle navigation system main body, said housed gyro-sensor being supported horizontally;
   a retaining indentation fixed to said housing; and
   a spherical section provided on an end of an arm extended from said housed gyro-sensor, said spherical section engaged with said retaining indentation.

9. A vehicle navigation system comprising:
   a housing;
   a vehicle navigation system main body provided in said housing;
   a housed gyro-sensor movably supported in said housing without reference to a mounting angle of said vehicle navigation system main body, said housed gyro-sensor being supported horizontally;
   a mounting hole formed in said housing; and
   a rotation plate (1) mounted for rotation in said mounting hole, (2) housing said housed gyro-sensor, and (3) provided with a balancer disposed below said housed gyro-sensor.

10. A vehicle navigation system according to claim 9, further comprising:
    a damper (1) supported on said housing, (2) having a contact end which contacts with said rotation plate, (3) absorbing a rapid rotation force of said rotation plate, and (4) not absorbing a slight rotation force of said rotation plate.

11. A vehicle navigation system comprising:
    a housing;
    a vehicle navigation system main body provided in said housing;
    a housed gyro-sensor provided in said housing; and
    an inclination detection mechanism (1) detecting an inclination of said housed gyro-sensor and (2) correcting an output value from said housed gyro-sensor depending on an inclination of said car navigation system main body to a value corresponding to a value when said housed gyro-sensor is disposed horizontally.

12. A method of mounting a gyro-sensor in a vehicle navigation system, comprising the steps of:
    providing a mounting hole in a housing of the vehicle navigation system; and
    passing the gyro-sensor through the mounting hole from an exterior of the housing, so as to locate the gyro-sensor in an interior of the housing.

13. A method of mounting a gyro-sensor according to claim 12, further comprising the step of:

fixing the gyro-sensor in a position depending on a mounting angle of the housing.

14. A method of mounting a gyro-sensor according to claim 12, further comprising the step of:

moving the gyro-sensor relative to the housing, via gravity as motive force, such that the gyro-sensor is supported horizontally without reference to a mounting angle of said housing.

* * * * *